(12) United States Patent
Nakatsu (10) Patent No.: US 9,089,779 B2
(45) Date of Patent: Jul. 28, 2015

(54) GAME CONTROL APPARATUS FOR A SACRIFICE COMMAND IN A GAME

(71) Applicant: DeNA Co., Ltd., Tokyo (JP)

(72) Inventor: Mototaka Nakatsu, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/050,409

(22) Filed: Oct. 10, 2013

(65) Prior Publication Data

US 2014/0256428 A1 Sep. 11, 2014

(30) Foreign Application Priority Data

Mar. 6, 2013 (JP) ................................. 2013-044655

(51) Int. Cl.
*A63F 9/04* (2006.01)
*A63F 13/822* (2014.01)
*A63F 13/847* (2014.01)
*A63F 13/533* (2014.01)
*A63F 13/69* (2014.01)
*A63F 13/45* (2014.01)
*A63F 1/00* (2006.01)
*A63F 13/40* (2014.01)

(Continued)

(52) U.S. Cl.
CPC ............... *A63F 13/822* (2014.09); *A63F 1/00* (2013.01); *A63F 13/45* (2014.09); *A63F 13/533* (2014.09); *A63F 13/69* (2014.09); *A63F 13/847* (2014.09); *A63F 1/02* (2013.01); *A63F 3/00075* (2013.01); *A63F 13/10* (2013.01); *A63F 13/30* (2014.09); *A63F 13/537* (2014.09); *A63F 13/5375* (2014.09); *A63F 2003/00996* (2013.01); *A63F 2300/208* (2013.01); *A63F 2300/65* (2013.01); *A63F 2300/807* (2013.01)

(58) Field of Classification Search
CPC ............ A63F 1/00; A63F 2003/00996; A63F 3/00075; A63F 1/02; A63F 13/12; A63F 13/10; A63F 13/69; A63F 2300/575; A63F 2300/65; A63F 2300/807; A63F 2300/206; A63F 2300/208; G07F 17/3276
USPC .............................................. 463/9–10, 40–42
See application file for complete search history.

(56) References Cited

U.S. PATENT DOCUMENTS

2007/0273096 A1  11/2007  Inubushi et al.
2012/0313320 A1* 12/2012  Hansen et al. ................ 273/146

FOREIGN PATENT DOCUMENTS

JP      2001-340643     12/2001
JP      2005-168744     6/2005

OTHER PUBLICATIONS

"Magic: The Gathering Online", Version 3.0 released Apr. 22, 2008, WIKI, <http://en.wikipedia.org/wiki/Magic:_The_Gathering_Online>.*

(Continued)

*Primary Examiner* — Justin Myhr
(74) *Attorney, Agent, or Firm* — IPUSA, PLLC (57) ABSTRACT

A game control apparatus includes an operation accepting unit that accepts an operation input from a player; and a game progression unit that, in addition to performing a battle by a game medium based on the operation input accepted by the operation accepting unit, activates, when the operation accepting unit accepts an operation input to perform a sacrifice command based on a predetermined game medium, a predetermined effect based on sacrifice command management information and invalidates a game medium used for the sacrifice command.

7 Claims, 9 Drawing Sheets

(51) Int. Cl.
   *A63F 13/537* (2014.01)
   *A63F 3/00* (2006.01)
   *A63F 13/30* (2014.01)
   *A63F 13/5375* (2014.01)
   *A63F 1/02* (2006.01)

(56) References Cited

OTHER PUBLICATIONS

"Berserk" Card, Aug. 12, 2009, gatherer.wizards.com, <https://web.archive.org/web/20090812113736/http://gathererwizards.com/Pages/Card/Details.aspx?multiverseid=738>.*

"Two-Headed Giant", Mar. 4, 2012, mtg.wikia.com, <http://mtg.wikia.com/wiki/Two-Headed_Giant?oldid=25823>.*

"Breath of Fury" Card (Magic the Gathering), Mar. 15, 2010, gatherer.wizards.com, <https://web.archive.org/web/20100315192613/http://gathererwizards.com/Pages/Card/Details.aspx?multiverseid=89099>.*

Magic the Gathering, "Rage Nimbus", archived Feb. 2, 2011, <https://web.archive.org/web/20110202031927/http://gatherer.wizards.com/Pages/Card/Details.aspx?multiverseid=193454>.*

Japanese Office Action mailed Nov. 12, 2013.

Kajiwara Seisakusho, "Squ-Eni, AC "Lord of Vermilion" Loca-test version first impression", [online], Dec. 27, 2007, Impress Watch Co., Ltd., Game watch, (searched Nov. 5, 2013), the Internet URL: http://game.watch.impress.co.jp/docs/20071227/lov.htm, with English concise explanation.

* cited by examiner

SCENARIO INFORMATION 421

| CONDITION | MISSION OR THE LIKE | .. |
|---|---|---|

FIG.6

SACRIFICE COMMAND MANAGEMENT INFORMATION 422

| CONDITION | CARD ID | EFFECT | .. |
|---|---|---|---|

FIG.7

PLAYER INFORMATION

| PLAYER ID | ICON DATA | PLAYER NAME | TEAM | STATUS | MODE | POSSESSED CARD | DECK CARD | BATTLE HISTORY | POINT | ... |

FIG.8

CARD INFORMATION

| CARD ID | CARD NAME | CARD IMAGE | PARAMETER (KIND, ATTACK POWER, DEFENSE POWER, ...) | ... |

GAME CONTROL APPARATUS FOR A SACRIFICE COMMAND IN A GAME

CROSS-REFERENCE TO RELATED APPLICATION

The present application is based on and claims the benefit of priority of Japanese Priority Application No. 2013-044655 filed on Mar. 6, 2013, the entire contents of which are hereby incorporated by reference.

BACKGROUND OF THE INVENTION

1. Field of the Invention

The present invention relates to a technique of controlling a game.

2. Description of the Related Art

A game system is known that performs a battle game in which a player uses a game medium such as a card (character card) or the like (see Patent Document 1, for example).

Winning or losing in the battle game is determined based on a parameter such as an attack power, a defense power or the like set for each card.

Thus, it is difficult for the player who only has weak cards to easily win the battle game and thus, there has been a problem in that such a player cannot feel interested in the game.

Further, even where the player has strong cards in addition to the weak cards, there has been a problem in that there is no way to use the weak cards in the game.

Meanwhile, in such kinds of games, an event may be held in which players form a team to beat an enemy by cooperating with each other in a team battle.

However, as a contribution to a team weighs in the team battle, there has been a problem in that a player who only has weak cards cannot contribute to the team and cannot feel interested in the game.

Further, during an event period, there is a case that a predetermined card, among cards possessed by the players, is set to have an attack power value that is a few times of an attack power value of the card at a normal state, as a special attack card. There are some kinds of special attack cards, and some of them are set to have attack power values that are 2 to 15 times that of the attack power values of the cards at normal, respectively. Thus, for the player who has a special attack card whose attack power value is 15 times of normal, a special attack card whose power value is twice that of normal is seldom used, and as the card returns to a normal card after the event period ends, there was no way to use the card.

PATENT DOCUMENT

[Patent Document 1] Japanese Laid-open Patent Publication No. 2005-168744

SUMMARY OF THE INVENTION

The present invention is made in light of the above problems, and provides a technique to improve interest in a game by improving a value of a game medium with a lower capability.

According to an embodiment, there is provided a game control apparatus including: an operation accepting unit that accepts an operation input from a player; and a game progression unit that, in addition to performing a battle by a game medium based on the operation input accepted by the operation accepting unit, activates, when the operation accepting unit accepts an operation input to perform a sacrifice command based on a predetermined game medium, a predetermined effect based on sacrifice command management information and invalidates a game medium used for the sacrifice command.

BRIEF DESCRIPTION OF THE DRAWINGS

Other objects, features and advantages of the present invention will become more apparent from the following detailed description when read in conjunction with the accompanying drawings.

DETAILED DESCRIPTION OF THE PREFERRED EMBODIMENTS

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

(Structure)

Figure 1:
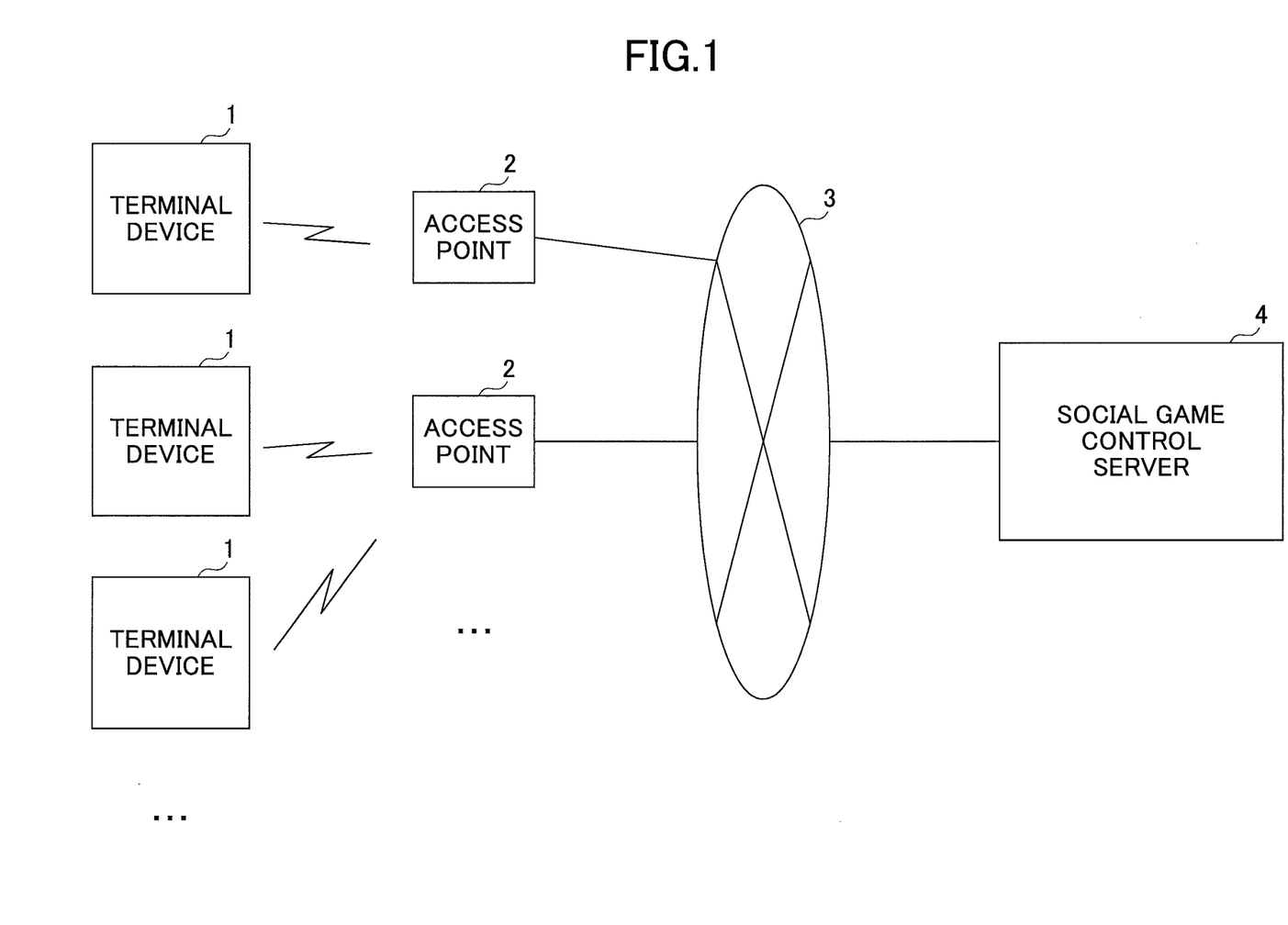
FIG. 1 is a view illustrating an example of a system structure of an embodiment.

FIG. 1 is a view illustrating an example of a system structure of the embodiment.

In FIG. 1, the system includes terminal devices (player terminals) 1 possessed by players (users) such as a smartphone, a mobile phone or the like, access points 2 such as a mobile station, a Wi-Fi station or the like, a network 3 such as INTERNET or the like and a social game control server 4 that manages (controls) a game in which a plurality of players play a game via the network.

Figure 2:
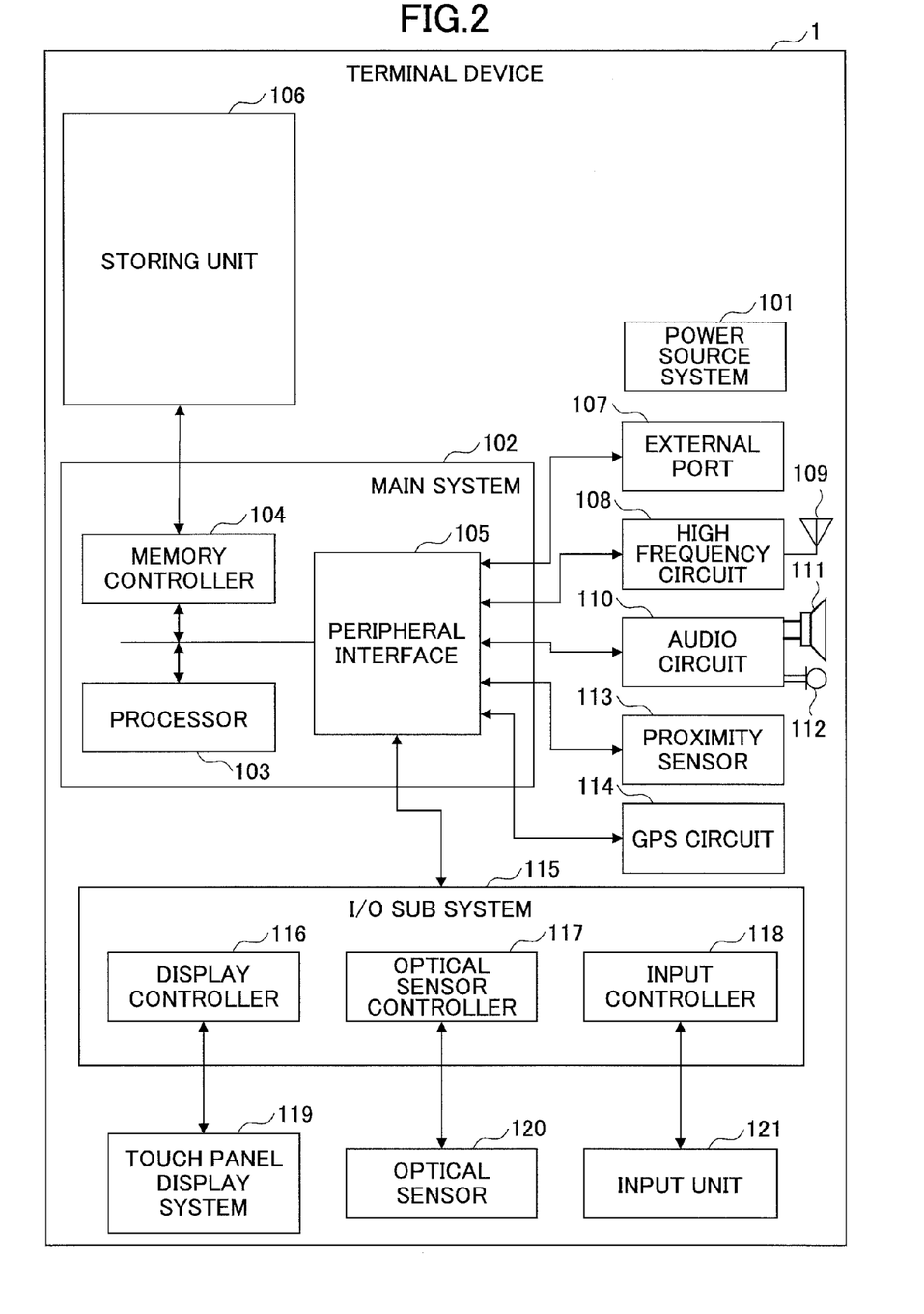
FIG. 2 is a view illustrating an example of a hardware structure of a terminal device.

FIG. 2 is a view illustrating an example of a hardware structure of the terminal device 1.

In FIG. 2, the terminal device 1 includes a power source system 101, a main system 102 including a processor 103, a memory controller 104 and a peripheral interface 105, a storing unit 106, an external port 107, a high frequency circuit 108, an antenna 109, an audio circuit 110, a speaker 111, a microphone 112, a proximity sensor 113, a GPS (Global Positioning System) circuit 114, an I/O (Input/Output) sub system 115 including a display controller 116, an optical sensor controller 117 and an input controller 118, a touch panel display system 119, an optical sensor 120 and an input unit 121.

Figure 3:
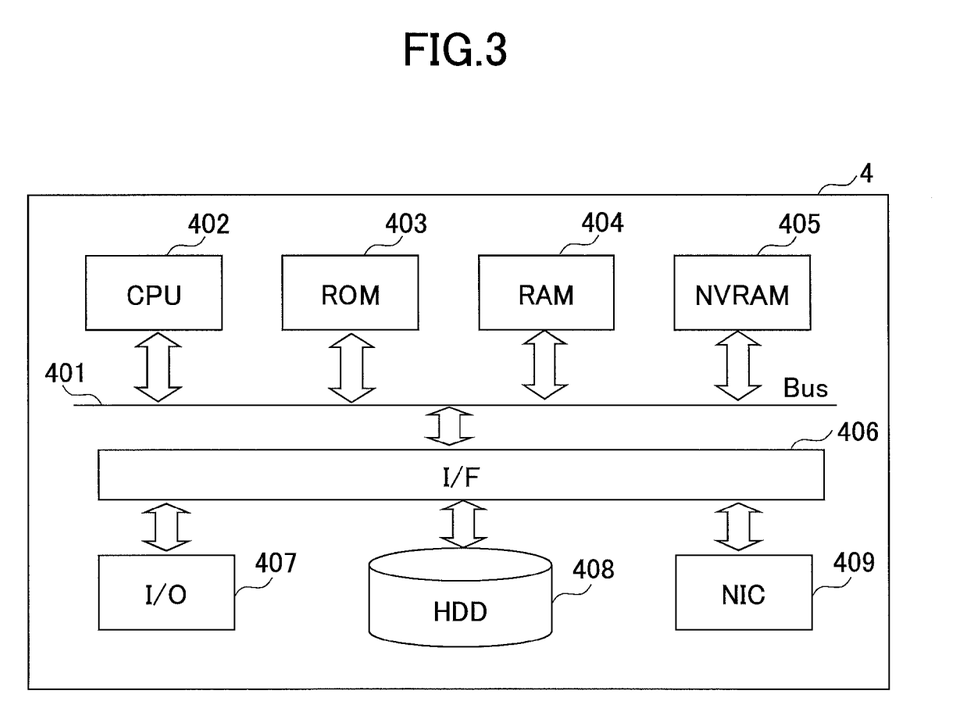
FIG. 3 is a view illustrating an example of a hardware structure of a social game control server.

FIG. 3 is a view illustrating an example of a hardware structure of the social game control server 4.

In FIG. 3, the game management server 4 includes a CPU (Central Processing Unit) 402, a ROM (Read Only Memory) 403, a RAM (Random Access Memory) 404, an NVRAM (Non-Volatile Random Access Memory) 405 and an I/F (Interface) 406 connected to a system bus 401, an I/O (Input/Output Device) 407 for a keyboard, a mouse, a monitor, a CD/DVD (Compact Disk/Digital Versatile Disk) drive or the like, an HDD (Hard Disk Drive) 408 and an NIC (Network Interface Card) 409 connected to the I/F 406, and the like.

Figure 4:
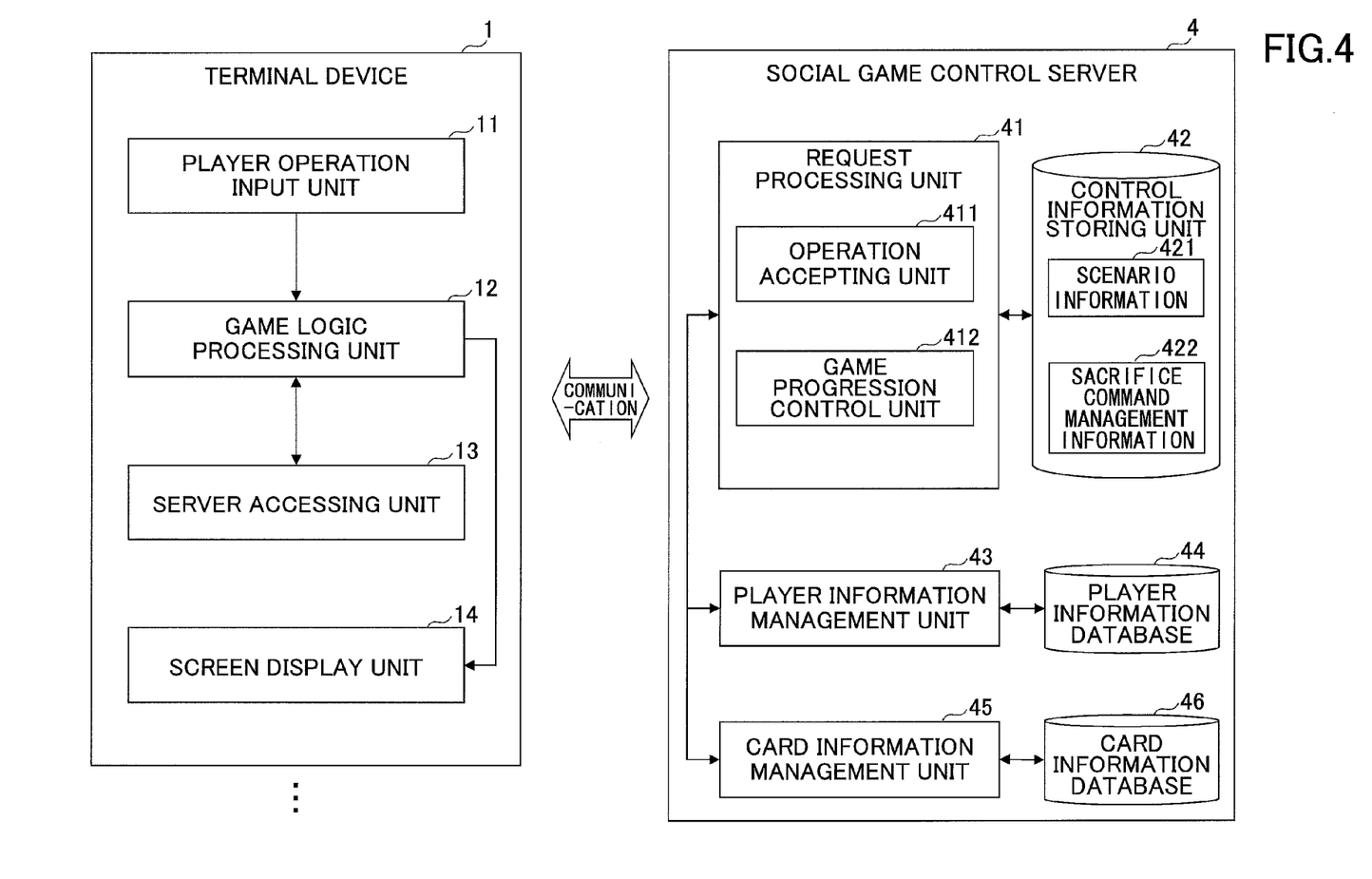
FIG. 4 is a view illustrating an example of a functional structure of the terminal device and the social game control server.

FIG. 4 is a block diagram illustrating an example of a functional structure of the terminal device 1 and the social game control server 4.

In FIG. 4, the terminal device 1 includes a player operation input unit 11, a game logic processing unit 12, a server accessing unit 13 and a screen display unit 14.

The player operation input unit 11 has a function to input (accept) an operation of a player that operates the terminal device 1.

The game logic processing unit 12 has a function to advance a game by transitioning screens in accordance with an input operation of the player input by the player operation input unit 11. There are cases for the game logic processing unit 12 in which the game logic is processed based on page data described in a Hyper Text Markup Language (HTML) or the like and scripts or the like included in the page data sent from the game control server apparatus 4 (browser type), and in which the game logic is processed based on an application which is previously downloaded and installed in the terminal device 1 (application type).

The server accessing unit 13 has a function to send a request to the social game control server 4 and receive a processed result or the like as a response from the game control server 4 when it is necessary to access the social game control server 4 in a course of the processing by the game logic processing unit 12. Here, the request includes a request of updating and a request of referring to data. The request of updating is to update player information or the like. The request of referring to data is to refer to the player information or the like.

The screen display unit 14 has a function to display screens under control of the game logic processing unit 12.

Meanwhile, the social game control server 4 includes a request processing unit 41, a control information storing unit 42, a player information management unit 43, a player information database 44, a card information management unit 45 and a card information database 46. The request processing unit 41 includes an operation accepting unit 411 and a game progression control unit 412. The control information storing unit 42 stores scenario information 421 and sacrifice command management information 422.

The request processing unit 41 has a function to receive a request from the terminal device 1, performs a corresponding process and send a processed result of the request to the terminal device 1 as a response. When the request processing unit 41 receives the request of updating, the request processing unit 41 performs an operation to update the player information or the like, and sends the updated player information or the like that is changed by the operation as the processed result. When the request processing unit 41 receives the request of referring to data, the request processing unit 41 refers to and obtains the corresponding player information or the like, and sends the obtained player information or the like as the processed result. Here, the response by the request processing unit 41 may include screen information which is to be operated by the player next, for the browser type.

The operation accepting unit 411 is a function unit that is mainly used for the browser type, and has a function to accept a predetermined operation input from the terminal device 1. For the application type, the game logic processing unit 12 of the terminal device 1 has a function corresponding to the operation accepting unit 411.

The game progression control unit 412 is a function unit mainly used for the browser type. The game progression control unit 412 has a function to control game progression based on the various information of the control information storing unit 42, a status of the player stored in the player information database 44 and the operation accepted by the operation accepting unit 411. For the application type, the game logic processing unit 12 of the terminal device 1 has a function corresponding to the game progression control unit 412.

The player information management unit 43 has a function to store various information (player information) of all of the players participating in the game in the player information database 44 and manage the information. The player information management unit 43 refers to or updates the player information in response to a request from the request processing unit 41.

The card information management unit 45 has a function to store various information of cards (character cards) used in the game in the card information database 46 and manage the information. The card information management unit 45 refers to or updates the card information in response to a request from the request processing unit 41.

Figure 5:
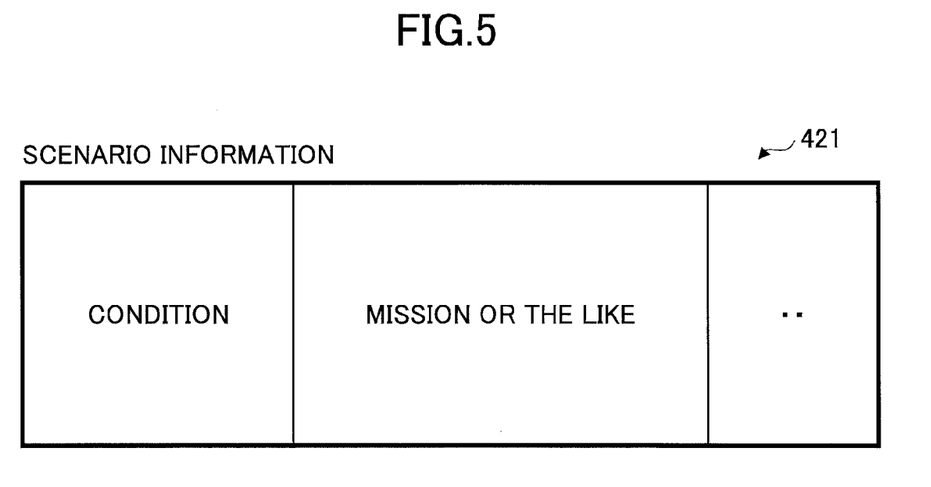
FIG. 5 is a view illustrating an example of a data structure of scenario information.

FIG. 5 is a view illustrating an example of a data structure of the scenario information 421. The scenario information 421 includes items (fields) such as "condition", "mission or the like" or the like. The "condition" is data indicating a condition such as a status or the like of the player for whom the mission or the like is activated. The "mission or the like" is data to specify a mission or the like that is activated when the condition is satisfied.

Figure 6:
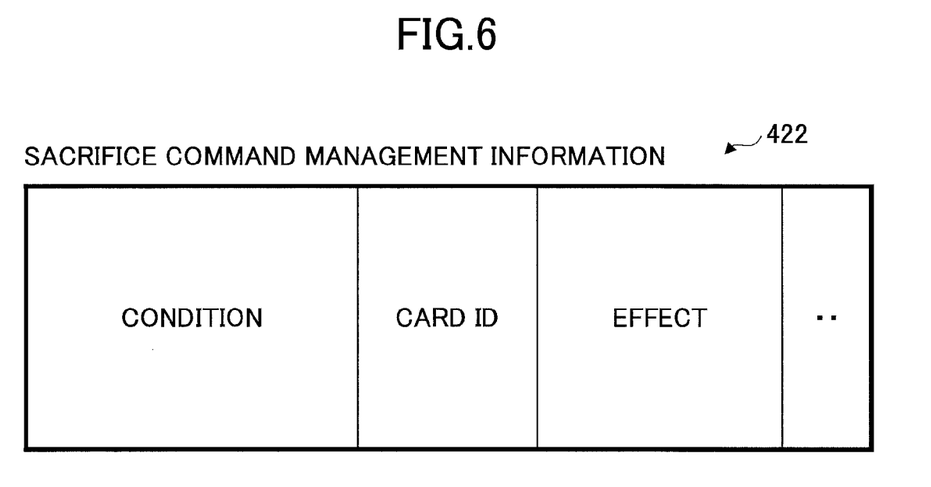
FIG. 6 is a view illustrating an example of a data structure of sacrifice command management information.

FIG. 6 is a view illustrating an example of a data structure of the sacrifice command management information 422. The sacrifice command management information 422 includes items such as "condition", "card ID", "effect" or the like. The "condition" is data indicating a condition to have the sacrifice command being capable of being used. By setting that the sacrifice command can be only used when a predetermined condition is satisfied, complication in operation by the player due to introducing the sacrifice command can be suppressed, and also, the game balance can be retained by reducing the use of the sacrifice command. The "card ID" is data to specify the card used for a sacrifice command. The "effect" is data indicating an effect when the sacrifice command is used.

As the "condition", one of the following or a combination of the following can be raised. Here, the sacrifice command can be only used when the player is in a battle mode.

When the player possesses a specific kind of card (a special attack card, for example), or the specific kind of card is placed at a battle deck of the player.

When the player possesses a card corresponded with an enemy character, or the card is placed at the battle deck of the player (That is, cards corresponding to enemy characters are previously set, respectively, and only a card that corresponds to the enemy character appearing in the game battle can be a target of the sacrifice command).

When the team to which the player belongs to is in a specific situation (when the team is losing the team battle (inferior in the team battle), for example).

When the player is in a specific situation (When the contribution of the player is low among the team members, for example).

When being randomly selected.

As the condition, in the light of increasing a value of a card with a weak parameter, it is desirable to select a card that is relatively weak such as a "twice special attack card" or the like. By sacrificing such a weak card, a large damage can be caused to the enemy. This can be an incentive for the player to contribute to the team by consuming the card for the sacrifice command during the event period as the special attack card returns to an ordinary card after the event ends. By providing a contributing means to the team for the player and increasing opportunities for the player to contribute to the team in the team battle in which cards are used, the feeling of solidarity for the team can be increased.

When the condition is that the player possesses a card corresponded with the enemy character or the card is placed at the battle deck of the player, it is possible to proceed the game as having a story and the player can naturally use the sacrifice command. For example, the story may be that a character that has an old relationship with an enemy character performs a self-destruction in order to remove the causality. Further, characters that have a causality therebetween may be corresponded with each other based on a battle history of the player.

When a plurality of cards satisfy the condition, a target of the sacrifice command may be randomly selected, selected in order of strength, selected in order of used frequency, or the like.

The "card ID" may be a single card, or a plurality of cards may be a target of the sacrifice command for a single sacrifice command.

For the "effect", a damage may be caused to a single enemy, or the damage may be caused to all enemies that are displayed on an enemy list in the battle screen. An effect may be added in which experience values for the team members to obtain are increased for a predetermined period when a player performs the sacrifice command in the team battle. An effect may be added in which a bonus damage is added when the team members successively perform the sacrifice commands (when "combo" is performed).

Figure 7:
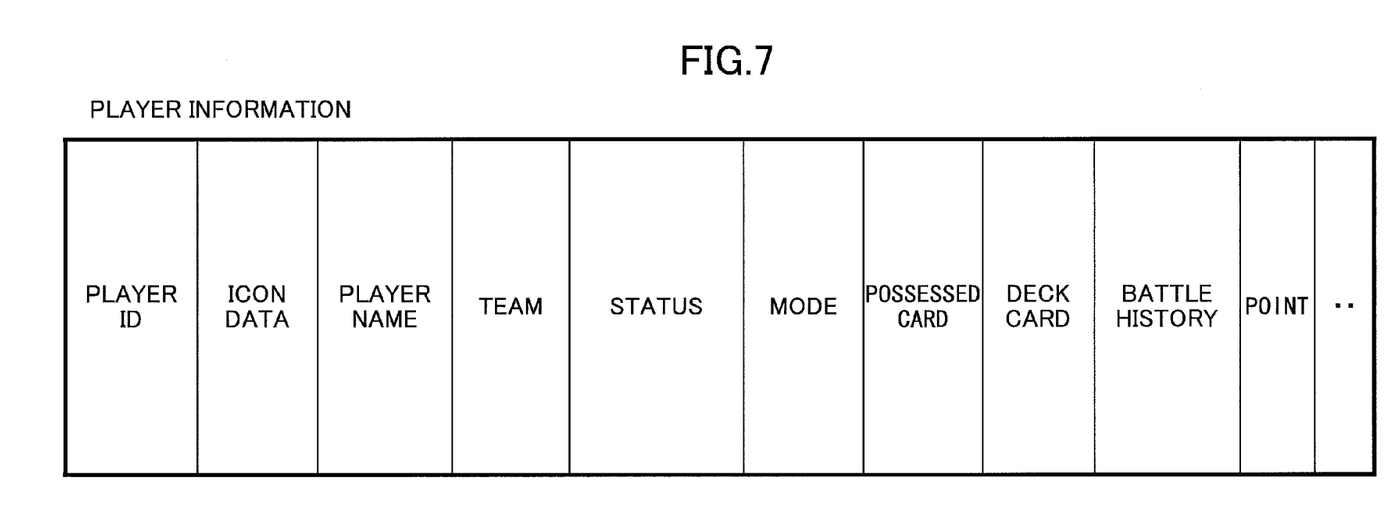
FIG. 7 is a view illustrating an example of a data structure of player information.

FIG. 7 is a view illustrating an example of a data structure of the player information stored in the player information database 44. The player information includes items such as "player ID", "icon data", "player name", "team", "status", "mode", "possessed card", "deck card", "battle history", "point", or the like. The "player ID" is data to specify (identify) the player. The "icon data" is data indicating a display icon of the player. The "player name" is data for a display name of the player. The "team" is data to specify a team to which the player belongs. The "status" is data indicating a game progression degree of the player. The "mode" is data indicating a current mode (a battle mode, for example) of the player.

The "possessed card" is data to specify cards possessed by the player. The "deck card" is data to specify cards that are placed at the battle deck by the player, among the possessed cards. The "battle history" is history of battles of the player. The "point" is data indicating points obtained by the player in the game.

Figure 8:
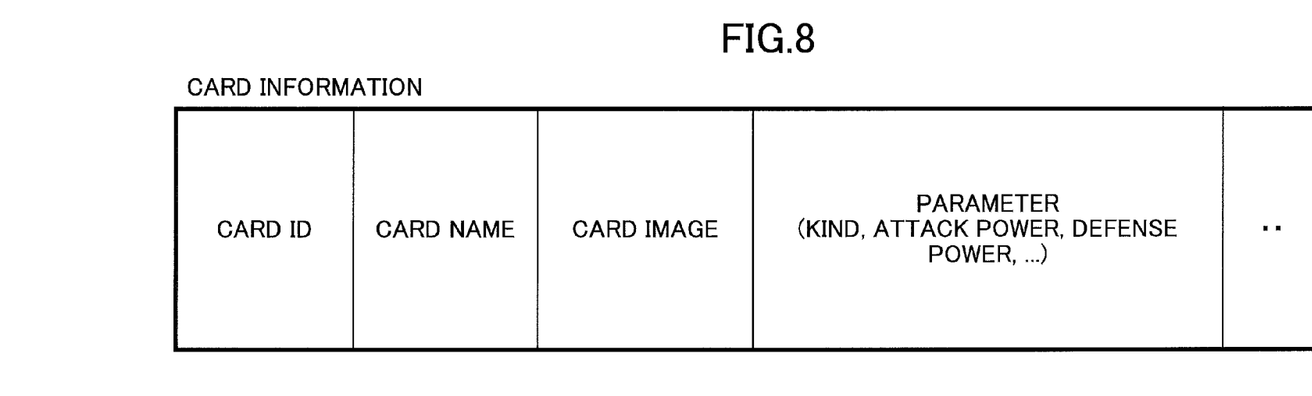
FIG. 8 is a view illustrating an example of a data structure of card information.

FIG. 8 is a view illustrating an example of a data structure of the card information stored in the card information database 46. The card information includes items such as "card ID", "card name", "card image", "parameter" or the like. The "card ID" is data to specify a card. The "card name" is data for a display name of the card. The "card image" is data indicating a display image of the card. The "parameter" is data indicating characteristics such as a kind of, an attack power, a defense power or the like of the card.

(Operation)

Figure 9:
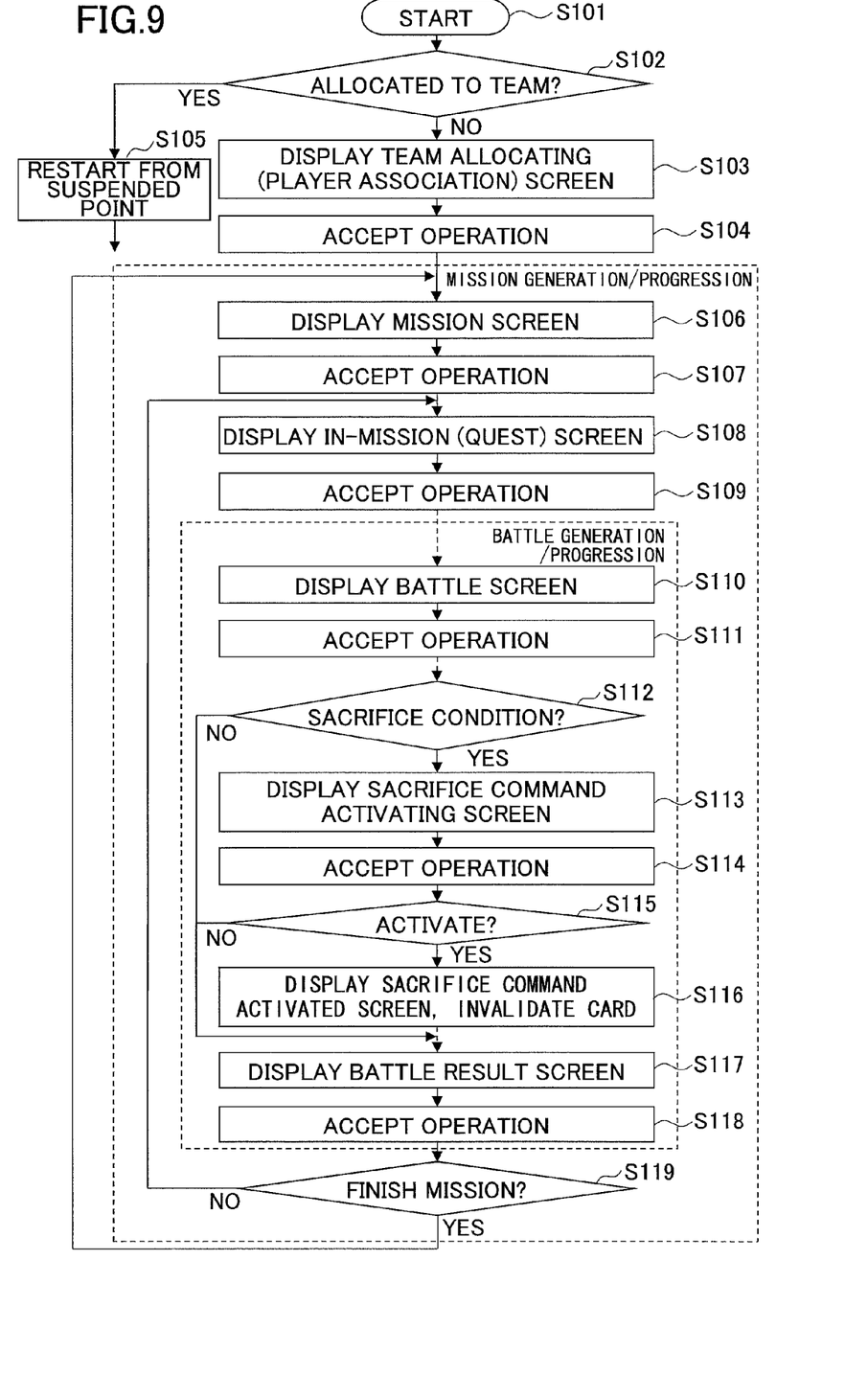
FIG. 9 is a sequence diagram illustrating an example of a process of the embodiment.

FIG. 9 is a sequence diagram illustrating an example of a process of the embodiment. It is assumed that the player who operates the terminal device 1 previously performs a log-in operation to the social game control server 4 so that the social game control server 4 can specify the player ID.

In FIG. 9, when the player operation input unit 11 of the terminal device 1 accepts an operation to start (including restart) a game by the player, the game logic processing unit 12 recognizes the operation as an operation to start the game and notifies the starting of the game via the server accessing unit 13 to the social game control server 4. Thereafter, the game progression control unit 412 of the request processing unit 41 recognizes the operation to start the game and starts a process (step S101).

First, the game progression control unit 412 determines whether the player is already allocated to a team (step S102). The game progression control unit 412 may make the determination by referring to the player information (FIG. 7) of the player information database 44 via the player information management unit 43 based on the player ID and determining whether the team for the player is an effective value.

When it is determined that the player is not allocated to a team yet (NO in step S102), the game progression control unit 412 allocates the player to either team and causes the terminal device 1 to display a team allocating screen (step S103). The game progression control unit 412 allocates the player to the team based on a predetermined rule or by selecting a team for which the member is in short from the player information of the player information database 44 via the player information management unit 43, and by updating the team of the player. Allocation to the team may be considered as an association between players. When screen information of an allocated result is sent to the terminal device 1 and received by the server accessing unit 13, under control of the game logic processing unit 12, the screen display unit 14 displays the allocation result. The process of the allocation of the team may be automatically performed at background without displaying the team allocating screen or a screen for a confirmation by the player.

Then, the player operation input unit 11 of the terminal device 1 accepts an operation of a confirmation or the like by the player. Thereafter, under control of the game logic processing unit 12, the operation of the confirmation or the like is transmitted from the server accessing unit 13 to the game progression control unit 412 of the request processing unit 41 of the social game control server 4 (step S104), and a subsequent process is performed.

When it is determined that the player is already allocated to a team (YES in step S102), it means that the allocation of the team is already finished. Thus, at this time, the game progression control unit 412 does not perform the above process and starts a process from a previously suspended point (step S105). The game progression control unit 412 restarts the process by referring to the status or the like of the player information of the player information database 44 via the player information management unit 43 based on the player ID of the player and specifying a process corresponding to the status or the like.

After the confirmation of the allocation of the team (step S104) or when restarting the process from the suspended point, the game progression control unit 412 causes the terminal device 1 to display a mission screen (step S106). This means that the game progression control unit 412 refers to the player information of the player information database 44 via the player information management unit 43 based on the player ID of the player and obtains the status or the like. The game progression control unit 412 refers to the scenario information (FIG. 5) of the control information storing unit 42 based on the obtained status or the like and obtains a mission corresponding to the status or the like. Then, the game progression control unit 412 generates a mission screen corresponding to the obtained mission and sends it to the terminal device 1. When the server accessing unit 13 of the terminal device 1 receives it, under control of the game logic processing unit 12, the screen display unit 14 displays the mission screen.

Then, the player operation input unit 11 of the terminal device 1 accepts an operation to proceed or the like by the player. Thereafter, under control of the game logic processing unit 12, the server accessing unit 13 transmits the operation to the game progression control unit 412 of the request processing unit 41 of the social game control server 4 (step S107), and a mission is advanced.

The game progression control unit 412 causes the terminal device 1 to display a in-mission screen (step S108). This means that the game progression control unit 412 sends the in-mission screen to the terminal device 1. Then, when the server accessing unit 13 of the terminal device 1 receives it, under control of the game logic processing unit 12, the screen display unit 14 displays it.

Then, when the player operation input unit 11 of the terminal device 1 accepts a predetermined operation by the player and the server accessing unit 13 transmits, under control of the game logic processing unit 12, the operation to the game progression control unit 412 of the operation to the request processing unit 41 of the social game control server 4 (step S109), a subsequent process is performed. When there are sequential in-mission screens, the above process is repeated.

Then, the game progression control unit 412 starts a battle mode under a condition that any one of the players meets an enemy character, and displays a battle screen on the terminal device 1 (step S110). This means that the game progression control unit 412 generates the battle screen and sends it to the terminal device 1. When the server accessing unit 13 of the terminal device 1 receives it, under control of the game logic processing unit 12, the screen display unit 14 displays the battle screen.

When a battle against an enemy character is started, members who belong to the team can participate in the battle and beat against the enemy character in cooperation with each other.

Then, an operation to the battle by the player is accepted by the player operation input unit 11 of the terminal device 1. Thereafter, under control of the game logic processing unit 12, the server accessing unit 13 transmits the operation to the game progression control unit 412 of the request processing unit 41 of the social game control server 4 (step S111). Then, a subsequent process is performed. When there are a plurality of battle screens, the above process is repeated.

In the course of the progression of the battle, the game progression control unit 412 determines whether the condition of the sacrifice command management information 422 (FIG. 6) is satisfied (step S112). Then, when the condition is satisfied (YES in step S112), the game progression control unit 412 controls to display a sacrifice command activating screen for the respective player (step S113).

Figure 10:
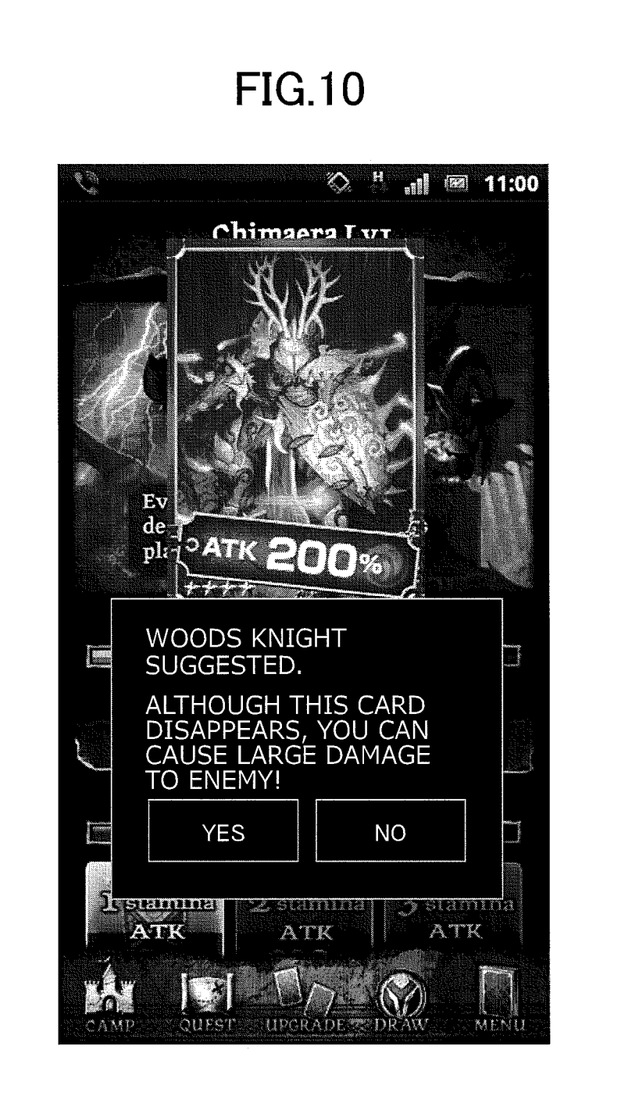
FIG. 10 is a view (1st) illustrating an example of a screen.

FIG. 10 illustrates an example of the sacrifice command activating screen and in which a message such as "Woods Knight suggested. Although this card disappears, you can cause large damage to enemy!" or the like and buttons of "YES" and "NO" are displayed.

Referring back to FIG. 9, when the player operation input unit 11 of the terminal device 1 accepts an operation of whether to perform a sacrifice command by the player, and the server accessing unit 13 transmits, under control of the game logic processing unit 12, the operation to the game progression control unit 412 of the request processing unit 41 of the social game control server 4 (step S114), a subsequent process is performed.

When the operation is to execute the sacrifice command (YES in step S115), the game progression control unit 412 invalidates the card that is used for the sacrifice command as well as displaying a sacrifice command activated screen that indicates a damage or the like to the enemy character by the sacrifice command (step S116).

The game progression control unit 412 obtains an effect by the sacrifice command from the sacrifice command management information 422. The card is invalidated by deleting the data of the respective card from the possessed card of the player information in the player information database 44 (FIG. 7) or adding a flag or the like indicating that the card is invalidated while leaving the data of the card in the possessed card of the player information in the player information database 44 via the player information management unit 43.

Figure 11:
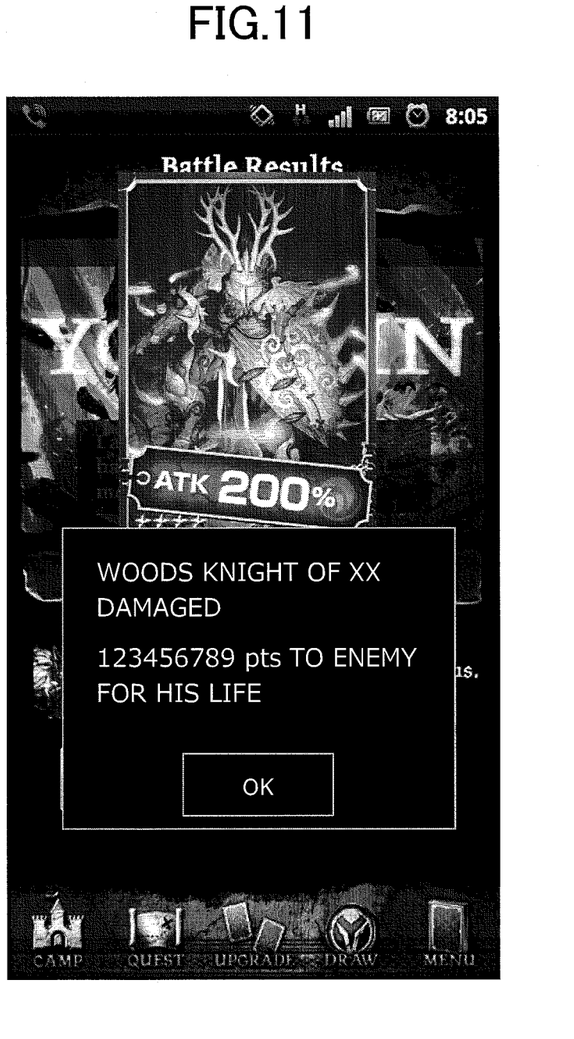
FIG. 11 is a view (2nd) illustrating an example of a screen.

FIG. 11 illustrates an example of the sacrifice command activated screen in which a message such as "Woods Knight of xx damaged 123456789 pts to enemy for his life" and an "OK" button for confirmation are displayed.

Referring back to FIG. 9, thereafter, when the battle is finished in accordance with the operation by the player, the game progression control unit 412 causes the terminal device 1 to display a battle result screen that includes a result of the battle (step S117). This means that the game progression control unit 412 sends the battle result screen to the terminal device 1 and when the server accessing unit 13 of the terminal device 1 receives the battle result screen, under control of the game logic processing unit 12, the screen display unit 14 displays the battle result screen. A capability such as a magic or a skill is acquired, or a reward or an arm is obtained as the battle result.

Then, the player operation input unit 11 of the terminal device 1 accepts an operation of confirmation or the like by the player, and the server accessing unit 13 transmits, under control of the game logic processing unit 12, the operation to the game progression control unit 412 of the request processing unit 41 of the social game control server 4 (step S118). Thereafter, a subsequent process is performed.

Then, the game progression control unit 412 determines whether the mission is finished (step S119).

When it is determined that the mission is not finished (NO in step S119), the process returns to the displaying of the in-mission screen (step S108).

When it is determined that the mission is finished (YES in step S119), the process returns back to the displaying of a next mission screen (step S106).

The player who operates the terminal device 1 in the above processes may suspend the game before and after the operation, and when the player restarts the game, the player can continue the game from the same situation.

Further, a case, in which generation/progression of the battle is performed after generation/progression of the mission is performed, is explained above. Alternatively, generation/progression of the battle may be performed without performing generation/progression of the mission. That is, the battle screen may be displayed (step S110) right after performing the processes of steps 5103 and 5104 when it is determined that the player is not allocated to a team (NO in step S102), and right after performing the process of step S105 when it is determined that the player is already allocated to a team (YES in step S102). Subsequent processes are the same as above.

Further, although a case, in which allocation of the player is performed, is explained above under a precondition that the battle is the team battle, the present invention can be applicable for an individual battle in which each player fights by himself/herself. That is, the mission screen (step S106) or the battle screen (step S110) may be displayed right after starting the game.

(Summary)

As described above, according to the embodiment, interest in a game can be improved by improving a value of a card (game medium) with a lower capability.

According to the embodiment, interest in a game can be improved by improving a value of a game medium with a lower capability.

Although a preferred embodiment of the invention has been specifically illustrated and described, it is to be understood that minor modifications may be made therein without departing from the spirit and scope of the invention as defined by the claims. The present invention is not limited to the specifically disclosed embodiments.

What is claimed is:

1. A game control apparatus including a processor and a memory, comprising:
  a game progression unit that provides a game in which a battle is held in a predetermined event and a sacrifice command is usable in the battle only when a predetermined condition is satisfied in the course of the progression of the battle,
    a normal attack power value being originally set to each of a plurality of game mediums that are used in the battle,
    the plurality of game mediums including a plurality of special game mediums, and
    as an original effect of each of the plurality of special game mediums, a number selected from predetermined numbers being set to each of the plurality of special game mediums such that an increased attack power value obtained by multiplying the normal attack power value of the game medium by the selected number is set during the predetermined event and the increased attack power value is returned back to the normal attack power value when the predetermined event ends;
  a control information storing unit that stores sacrifice command management information including the predetermined condition by which the sacrifice command is usable, data to specify a game medium usable for the sacrifice command and a predetermined effect activated by the sacrifice command corresponded with each other,
    the game medium usable for the sacrifice command being one of the special game mediums, and
    the predetermined effect being different from the original effect of the special game medium corresponded with the predetermined effect and the predetermined effect being selected from causing a damage to a single enemy, causing a damage to all enemies, increasing experience values for players in a same team as the player who used the sacrifice command for a predetermined period, and adding a bonus damage when players in the same team successively use the sacrifice commands,
  wherein the game progression unit
    refers to the control information storing unit in the course of the progression of the battle and determines whether the predetermined condition is satisfied for a player,
    controls to display a sacrifice command activating screen for the player for asking the player whether to execute the sacrifice command when the predetermined condition is satisfied, the sacrifice command activating screen including information about the special game medium and the predetermined effect that are corresponded with the predetermined condition,
    receives an instruction from the player whether to execute the sacrifice command, and
    activates the predetermined effect corresponded with the predetermined condition by using the special game medium and invalidates the special game medium used for the sacrifice command upon receiving an instruction from the player to execute the sacrifice command, and
  wherein the game progression unit invalidates the special game medium by deleting or invalidating data regarding the special game medium used for the sacrifice command and corresponded with the player in a player information database, which stores data regarding a game medium possessed by a player in correspondence with the player.

2. The game control apparatus according to claim 1, Wherein in the sacrifice command management information, an enemy character of a battle is also corresponded with the data to specify a game medium usable for the sacrifice command, and
the predetermined condition further includes a condition that the enemy character appears in the battle.

3. The game control apparatus according to claim 1, wherein the special game medium usable for the sacrifice command is one of the special game mediums and to which a relatively low number is set compared with other special game mediums.

4. The game control apparatus according to claim 1, wherein in the battle in the predetermined event, a plurality of players are allocated to a team to beat an enemy character by cooperating with each other, and
the predetermined condition further includes a condition that a contribution of the player to the team is low among members of the team.

5. The game control apparatus according to claim 1, wherein the predetermined condition is that
(1) a player possesses the special game medium corresponded in the sacrifice command management information,
(2) the special game medium corresponded in the sacrifice command management information is placed at a battle deck of a player,
(3) a team to which a player belongs to is in a specific situation, or
(4) a player is in a specific situation.

6. The game control apparatus according to claim 1, wherein the special game medium usable for the sacrifice command is capable of being used as the special medium itself to activate the effect of multiplying the normal attack power value of the special game medium by the number set to the special game medium to be the increased attack power value, when not being used for the sacrifice command.

7. A non-transitory computer-readable recording medium having recorded thereon a program for a game control apparatus to execute functions, the game control apparatus including a control information storing unit that stores sacrifice command management information including a predetermined condition by which a sacrifice command is usable, data to specify a game medium usable for the sacrifice command and a predetermined effect activated by the sacrifice command corresponded with each other, and the functions executed by the program comprising:

a game progression function that provides a game in which a battle is held in a predetermined event and a sacrifice command is usable in the battle only when a predetermined condition is satisfied in the course of the progression of the battle, a normal attack power value being originally set to each of a plurality of game mediums that are used in the battle, the plurality of game mediums including a plurality of special game mediums, and as an original effect of each of the plurality of special game mediums, a number selected from predetermined numbers being set to each of the plurality of special game mediums such that an increased attack power value obtained by multiplying the normal attack power value of the game medium by the selected number is set during the predetermined event and the increased attack power value is returned back to the normal attack power value when the predetermined event ends, in the sacrifice command management information, the game medium usable for the sacrifice command being one of the special game mediums, and the predetermined effect being different from the original effect of the special game medium corresponded with the predetermined effect and the predetermined effect being selected from causing a damage to a single enemy, causing a damage to all enemies, increasing experience values for players in a same team as the player who used the sacrifice command for a predetermined period, and adding a bonus damage when players in the same team successively use the sacrifice commands; and wherein the game progression function refers to the control information storing unit in the course of the progression of the battle and determines whether the predetermined condition is satisfied for a player, controls to display a sacrifice command activating screen for the player for asking the player whether to execute the sacrifice command when the predetermined condition is satisfied, the sacrifice command activating screen including information about the special game medium and the predetermined effect that are corresponded with the predetermined condition, receives an instruction from the player whether to execute the sacrifice command, and activates the predetermined effect corresponded with the predetermined condition by using the special game medium and invalidates the special game medium used for the sacrifice command upon receiving an instruction from the player to execute the sacrifice command, and wherein the game progression function invalidates the special game medium by deleting or invalidating data regarding the special game medium used for the sacrifice command and corresponded with the player in a player information database, which stores data regarding a game medium possessed by a player in correspondence with the player.

* * * * *